Oct. 2, 1951     E. M. O'DONNELL     2,569,730

TRACTOR SEAT

Filed July 26, 1947

INVENTOR.
Edward M. O'Donnell
BY
*Sam J. Slotky*
ATTORNEY

Patented Oct. 2, 1951

2,569,730

UNITED STATES PATENT OFFICE 2,569,730

TRACTOR SEAT

Edward M. O'Donnell, Galva, Iowa

Application July 26, 1947, Serial No. 763,771

2 Claims. (Cl. 155—121)

My invention pertains to a tractor or other seat.

An object of my invention is to provide a tractor seat which is resiliently mounted to provide comfort for the occupant thereof.

A further and important object of my invention is to provide a seat which besides being resiliently mounted will constantly occupy a horizontal position regardless of the angle of the vehicle upon which the seat is mounted to thereby provide a comfortable seat for the occupant thereof.

A further object of my invention is to provide a completely resiliently mounted seat which includes shock absorbing features at all times, and to provide means for adjusting the resilient features so that the seat can be regulated for lighter or heavier persons.

A further object of my invention is to provide a seat having the above features, which is of simple construction.

Figure 1:
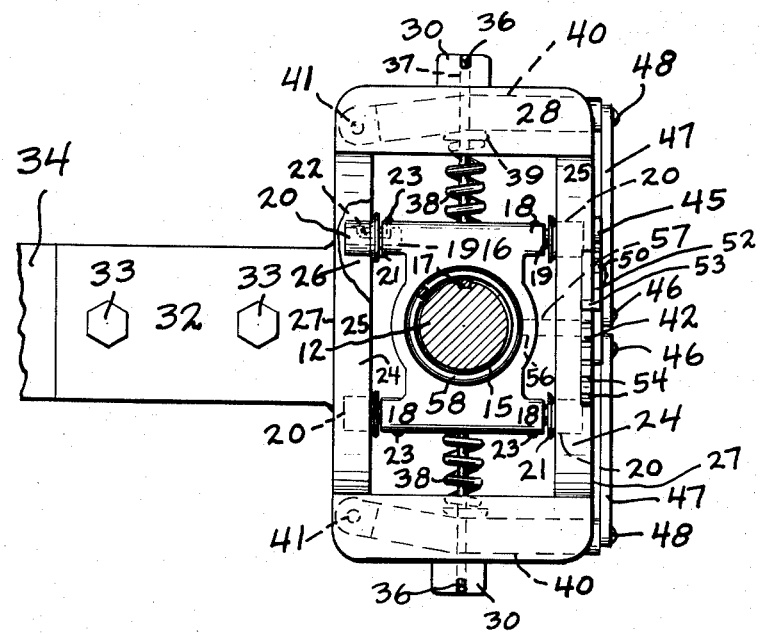
Figure 2:
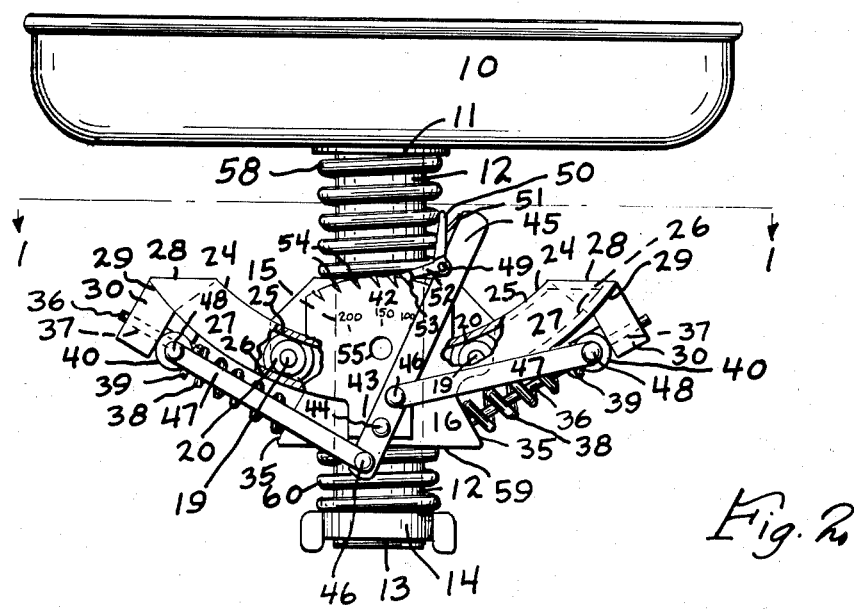

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view of Figure 2 taken along the lines 1—1 of Figure 2, and Figure 2 is a rear view of the arrangement.

I have used the character 10 to designate a seat, preferably for a tractor, although it will be understood that my invention pertains to any type of seat, the seat shown being of the slightly dished type in which the operator can sit. Attached at 11 to the seat 10 is a vertically positioned fairly heavy plunger 12 which is threadably attached at 13 with a wing nut 14. The plunger 12 is received through a cylindrical opening 15 in a carriage member 16, the plunger including a key at 17 for reception into both the plunger and the member 16 to prevent rotation of the plunger 12, and yet to allow free vertical movement. The carriage member 16 includes the extending bosses 18 in which are secured the pins or shafts 19, upon which shafts 19 are journaled the annular rollers 20 having the flanges 21. The shafts 19 include suitable openings 22 which communicate to the rollers and to the further grease fittings 23 for providing lubrication at desired intervals to the rollers. The rollers 20 ride within a pair of spaced channel shaped tracks 24 which tracks are in the shape of an arc and having upper flanges 25, lower flanges 26 and side flanges 27, these tracks being journaled at their outer ends by means of the transverse portions 28, and attached at 29 to the tracks are the downwardly inclined lugs 30.

Rigidly secured at 31 to one of the side walls 27 of the tracks is an extending flat bar 32 which can be secured by means of bolts 33 to the standard upwardly extending seat supporting bar 34 of the tractor.

The carriage member 16 includes the integral angular portions 35 to which are attached the rods 36 which rods pass through openings 37 in the lugs 30. Receiving the rods 36 are the fairly strong helical compression springs 38, the ends of which are received within the cupped members 39, which members 39 bear against the rods 40 which rods are pivoted at 41 to suitable bosses beneath the portions 28.

Forming an integral extension of the other side wall 27 is a plate 42 having a lower portion 43 to which is pivoted at 44 a tension adjusting lever 45 which is pivoted at 46 to a pair of links 47 which links are pivotally and securely attached at 48 to the ends of the rods 40. Pivotally attached at 49 to the lever 45 is a small control handle 50 having the leaf spring 51 bearing against the lever 45, and continuing from the member 50 is the arm 52 which includes the pawl 53 which is received with any one of the notches 54 in the upper plate portion 42. The plate 42 further includes an opening at 55, which is adapted in some cases to coincide or register with the opening 56 in the carriage member 16, and for the reception of a suitable pin 57 (see Fig. 1) in those cases when it is desired to lock the seat against arcuate movement, but to still allow completely vertical movement.

Receiving the plunger 12 and at the top of the carriage 16 is a strong helical compression spring 58, and positioned between the lower end 59 of the carriage is a further strong compression spring 60 which bears against the adjusting nut 14. It will now be seen that the seat 10 is resiliently supported so that it can travel upwardly and downwardly with respect to the carriage 16, and it will be seen further that if the tractor is riding on a hillside, etc., that the angular positioning of the tractor through the gravitational effect of the occupant of the seat, will cause the seat to maintain its horizontal position, and will thrust one pair of the rollers 20 to either one side or the other, with the springs 38 being compressed on one side and partially released on the other, in this manner causing the occupant of the seat to be completely comfortable regardless of the position of the vehicle, and with the springs 38 still absorbing shocks and the like. In this manner the seat 10 is completely resiliently supported regardless of angularity.

It will be observed that the springs 38 are firmly retained due to the structure above described, and in many cases it is desirable to adjust such a seat so that it can support persons of a lighter weight, or persons of a substantially heavier weight.

For instance as shown in Figure 2, the arrangement is set to support a person weighing about 100 pounds, with the springs being at a greater extended length, this pertaining to both the springs 38, as well as the springs 58 and 60, the nut 14 being at its lowermost position and wherein the spring resiliency is the least. To accommodate a person weighing 200 pounds, the lever 45 is first released by squeezing the handle 50 toward the lever which releases the pawl 53 and the lever is forced over to the position shown by the 200 pound marking. This action causes both links 47 to pull inwardly on the springs 38 thereby compressing these springs so that the resilient range of the springs is not as great and will accommodate a greater weight, and the adjusting nut 14 can be used to tighten up against the vertically positioned springs for the same purpose. The pawl 53 can then be relocked in any selected notch thereby providing the above mentioned adjustment.

After the pawl is locked all of the connecting elements are thus secured in a positive manner, and it will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tractor seat comprising a supporting framework, a seat member including a vertical plunger attached thereto, a spring receiving said plunger, means for adjustably tensioning said spring, a carriage member receiving said plunger, means for suspending said carriage member within said framework to provide oscillation of the seat member laterally, including a pair of spaced race-ways attached to said framework, rollers received in said race-ways, said rollers being attached to said carriage member, compression springs bearing against said carriage member and against the framework, said race-ways being substantially of an arcuate configuration to cause said rollers to travel in an arc therein, means for adjustably tensioning said compression springs to provide for varied weights of occupants of said seat member, including levers bearing against said compression springs, links attached to said levers, a control lever attached to said links whereby movement of said control lever will compress or release said compression spring, means for attaching said supporting framework to standard seat supports.

2. A tractor seat comprising a supporting framework, a seat member, means for suspending said seat member within said framework to provide oscillation of the seat member laterally, including a pair of spaced race-ways attached to said framework, rollers received in said race-ways, a carriage member to which said rollers are attached, compression springs bearing against said carriage member and against the framework, said race-ways being substantially of an arcuate configuration to cause said rollers to travel in an arc therein, means for adjustably tensioning said compression springs to provide for varied weights of occupants of said seat member, including levers bearing against said compression springs, links attached to said levers, a control lever attached to said links whereby movement of said control lever will compress or release said compression spring, means for attaching said supporting framework to standard seat supports.

EDWARD M. O'DONNELL.

REFERENCES CITED

The following references are of record in the file of this patent:

UNITED STATES PATENTS

| Number | Name | Date |
| --- | --- | --- |
| 75,306 | Smith | Mar. 10, 1868 |
| 383,868 | Davey | June 5, 1888 |
| 918,249 | Young | Apr. 13, 1909 |
| 1,616,546 | Pierson | Feb. 8, 1927 |
| 1,697,093 | Levis | Jan. 1, 1929 |
| 2,409,714 | Silhan | Oct. 22, 1946 |
| 2,489,981 | Rose | Nov. 29, 1949 |

FOREIGN PATENTS

| Number | Country | Date |
| --- | --- | --- |
| 205,034 | Canada | Oct. 26, 1920 |